United States Patent [19]

Kummermehr et al.

[11] 4,399,175

[45] Aug. 16, 1983

[54] HEAT-INSULATING BODY

[75] Inventors: Hans Kummermehr; Günther Mohr, both of Ludwigshafen, Fed. Rep. of Germany

[73] Assignee: Grunzweig + Hartmann und Glasfaser AG, Ludwigshafen, Fed. Rep. of Germany

[21] Appl. No.: 166,786

[22] Filed: Jul. 8, 1980

[30] Foreign Application Priority Data

Jul. 16, 1979 [DE] Fed. Rep. of Germany ....... 2928695

[51] Int. Cl.³ .............................................. B32B 5/16
[52] U.S. Cl. ..................................... 428/76; 428/241; 428/331; 428/428
[58] Field of Search ................. 428/76, 241, 331, 333, 428/428, 446

[56] References Cited

U.S. PATENT DOCUMENTS

| | | | |
|---|---|---|---|
| 2,051,849 | 8/1936 | Hanna | 156/289 |
| 2,113,068 | 4/1938 | McLaughlin, Jr. | 428/74 |
| 2,238,342 | 4/1941 | Riehl | 156/289 |
| 2,308,305 | 1/1943 | Reynolds | 156/289 X |
| 3,199,481 | 8/1965 | Handwerker | 112/420 |
| 3,869,334 | 3/1975 | Hughes et al. | 428/241 |

FOREIGN PATENT DOCUMENTS 1954992 10/1973 Fed. Rep. of Germany.
2036124 10/1979 Fed. Rep. of Germany.
752873 7/1956 United Kingdom.

Primary Examiner—Henry F. Epstein
Attorney, Agent, or Firm—Oblon, Fisher, Spivak, McClelland & Maier

[57] ABSTRACT

A heat-insulating body such as a heat-insulating slab is made whose insulating and heat-absorbing material includes a fine powder, in particular a silica aerogel which is pressed to form the body. To carry out the pressing operation a sack-like sheath is required but between the sheath and the insulating material a separating agent is provided which results in the fact that the surface of the insulating material does not intimately engage with the sheath which is for example of glass fibre fabric, the sheath being movable with respect to the insulating material after the pressing operation. Apart from the fact that the sheath can be removed for any cases where it would be a cause of disturbance, additionally the insulating body provides improved bending properties and even when made with a high pressing rate has a homogeneous structure. To make the insulating body the separating agent may be applied to the inner surfaces of the sheath, the particulate insulating material then being introduced and the sheath sealed, whereafter pressure is applied.

4 Claims, 3 Drawing Figures

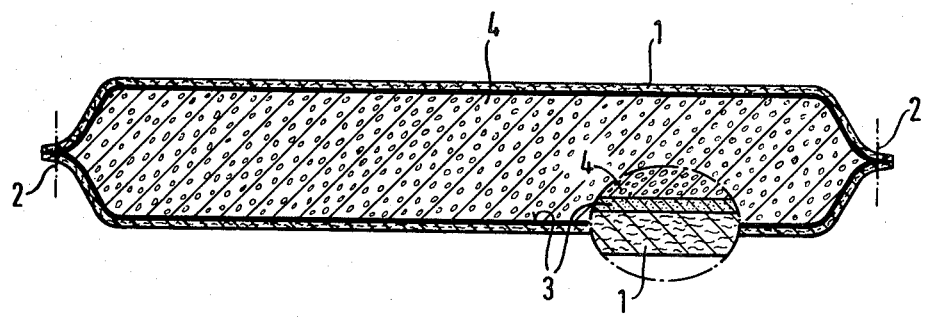
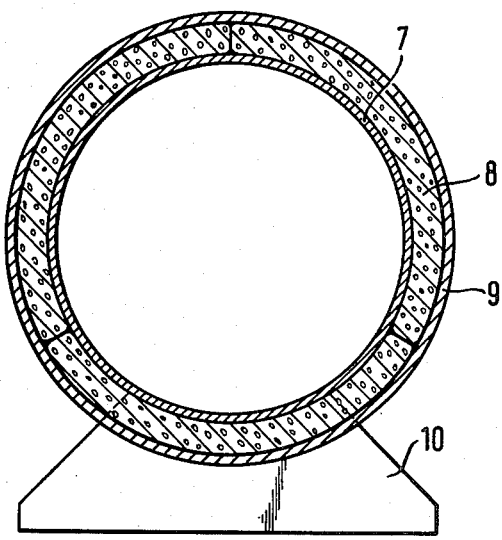

HEAT-INSULATING BODY

BACKGROUND OF THE INVENTION

1. Field of the Invention

The invention relates to a heat-insulating body having a particulate insulating material and a sheath of a sheet material, which is made by filling the sheath with the insulating material and subsequently shaping the sheath filled with the insulating material and compacing the insulating material, by applying excess pressure to the outside of the filled sheath.

2. Description of the Prior Art

DE-PS No. 1,954,992 discloses heat-insulating slabs which include a core of a mixture of finely dispersed materials, for example expanded silica, opacifying agent and mineral fibres, and an outer sheath of glass fibre fabric or the like. To make such slabs, generally the mixture of the finely dispersed materials is introduced into a sheath of glass fibre fabric or the like. Thereafter, the sheath is sewn up and pressed in a pressing operating to form a slab whose size depends on the dimensions of the sheath.

According to DE-PS No. 2,036,124 the pressing operation is carried out so that an intimate as possible interengaging of the finely dispersed materials together and with the surface or pores of the relatively rough sack material takes place so that upon completion of the pressing operation a sandwich is usually obtained. This sandwich includes the core of finely dispersed materials and the sheath. If the surface of the sheath is very rough or porous, without taking special steps, however, it is inevitable, or intended according to DE-PS No. 2,036,124, that the core material penetrates at least partially into the pores and thus anchors the core to the surface of the sheath. Such slabs have a relatively high bending stiffness and when subjected to bending stress break practically without appreciable deformation. Such insulating slabs are thus unable to adapt themselves to the irregularities of the object to be insulated, i.e. it is not readily possible to apply such slabs to surfaces curved in one or two dimensions.

A further disadvantage resides in the fact that the pressing operation for making such insulating slabs must take place relatively slowly. When the pressing operation is carried out relatively rapidly the cores of insulating slabs made in this manner have a slate-like inhomogeneous structure so that due to the resulting irregularities, the coefficient of the thermal conductivity of these slabs is impaired compared with a homogeneously pressed slab. In addition, insulating slabs made by such a method tend after pressing, due to the slate-like structure, to spring back to a relatively pronounced degree so that the thickness differences from slab to slab are relatively great.

SUMMARY OF THE INVENTION

The present invention is based on the problem of providing a heat-insulating body which in spite of a relatively rapid pressing operation has an homogeneous structure, i.e. does not form a slate-like structure, is not bonded to the sheath, i.e. does not have a sandwich structure, and has a relatively high bending deformability.

If a separating agent is provided between the sheath material and the insulating material and an adhering of the insulating material to the sheath during the pressing operation is thus reliably prevented, the surprising result is that the body thus made apart from the separation of sheath and core exhibits no slate-like core structure and has excellent bending properties. If the body made according to the invention, which is generally in the form of a slab, is subjected to a bending treatment it can be bent about 15 times better than the slab made according to DE-PS No. 2,036,124 before breakage occurs.

Because of the structure of the heat-insulating body produced according to the invention it is possible to bend such a slab about a round body having a ratio $R/D = 15$ and bend it back again without the core exhibiting after such a bending operation cracks or other disintegration phenomena wherein R is the radius of the circular body enclosed by the slab and D the slab thickness or thickness of the body. Corresponding to this flexibility or deformability the body made according to the invention may also be referred to as an enclosed plastically deformable body.

This extremely desirable bendability and the homogeneity of the core portion may be attributed to the fact that the separating agent disposed between the sheath and the core material permits completely free movability of the core insulating material during the pressing operation. The separating agent prevents in particular penetration of the insulating material into the fibres or between the cavities of the sheath formed between the fibres and consequently also the bonding of the insulating material boundary layer to the sheath. During the pressing operation the friction produced between the insulating material boundary surface and the sheath is almost completely cancelled by the separating agent so that no shearing stresses of any kind can build up within the core material. The core material can thus be freely built up during the pressing operation within the sheath to form a homogeneous core which exhibits no slate-like structure at all and no inhomogeneities due to shearing stresses.

The sheath may be made from various materials, for example glass fibres, quartz fibres, plastic fibres, natural fibres, such as cotton or silk, and from sheet materials such as paper or perforated plastic sheet, or fabrics or cloth, maintaining the permeability accordingly. Such materials are chosen in accordance with the pressure used, the operating temperature and the desired flexibility.

As for the particulate insulating material, powder or fibre particles and/or mixtures thereof may be used, and it is pointed out that the basic material itself used need not be a good thermal insulator. Advantageously, aluminium silicate fibres, quartz or glass fibres or further ceramic fibres, pulverulent aluminium or mixtures of flue ash with expanded silica, finely divided aluminium or chromium oxide and silica aerogel, possibly containing an opacifying agent such as titanium dioxide (ilmenite) may be used. The size of these particles may vary in a wide range; it generally lies however in a range from 10 Å to 2 mm.

As for the separating agent, materials may be used which reduce the adhesive forces and friction between the two adjoining surfaces so that adhesion is prevented. They should be chemically inert with respect to the materials to be processed, only slightly soluble therein and on the whole have a low volatility. Usually, such separating agents are used in the form of dispersions (emulsions or suspensions), pastes or powders. The separating agents may be applied by being powdered on, sprayed on, brushed or dipped. As separating agents organic or inorganic substances and/or mixtures thereof may be used.

Specific examples for separating agents on an organic basis are silicones, which are used either in solid form (in the form of the powder) or in the form of mixtures with water, oil, fats and the like; paraffin hydrocarbons such as waxes, hard waxes, paraffin wax, bee wax, candelilla wax, whereby the paraffin hydrocarbons may be of a natural or synthetic nature and possibly substituted with functional groups; fatty acids, such as stearic acid or palmitic acid, or their metal salts for example the calcium, lead, magnesium, aluminium or zinc salts; fats of an animal or vegetable origin, such as tallow, wool fat, palm oil; polymers, for example polyvinyl alcohol, polyamide and polyethylene, polymers of the fluorohydrocarbons, such as polytetrafluoroethylene; mineral oils, such as fatty oils, synthetic oils or their mixtures with fatty acids and/or chemically active substances, such as soaps.

Specific examples for inorganic lubricants are pulverulent talcum, mica, water-repellent pyrogenic silica, carbon black, graphite, prepared chalk, lime, clay, molybdenum sulphide and zinc sulphide. They may also be used in suspensions in water or mineral oil.

When selecting the solvent it must however be ensured that the structure of the core made is not impaired. Preferably, water-repellent pyrogenic silica is used in powder form, particularly when the core constitutes a mixture of pyrogenic silica, opacifying agent and fibres. To obtain an adequate separating effect generally 0.1–10 g separating agent is applied to the inner surface of the sheath in powder form.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1 shows in cross-section a heat-insulating body in the form of a slab.

FIG. 3 shows the use of the insulating body in insulating a boiler.

DETAILED DESCRIPTION OF THE PREFERRED EMBODIMENT

Figure 2:
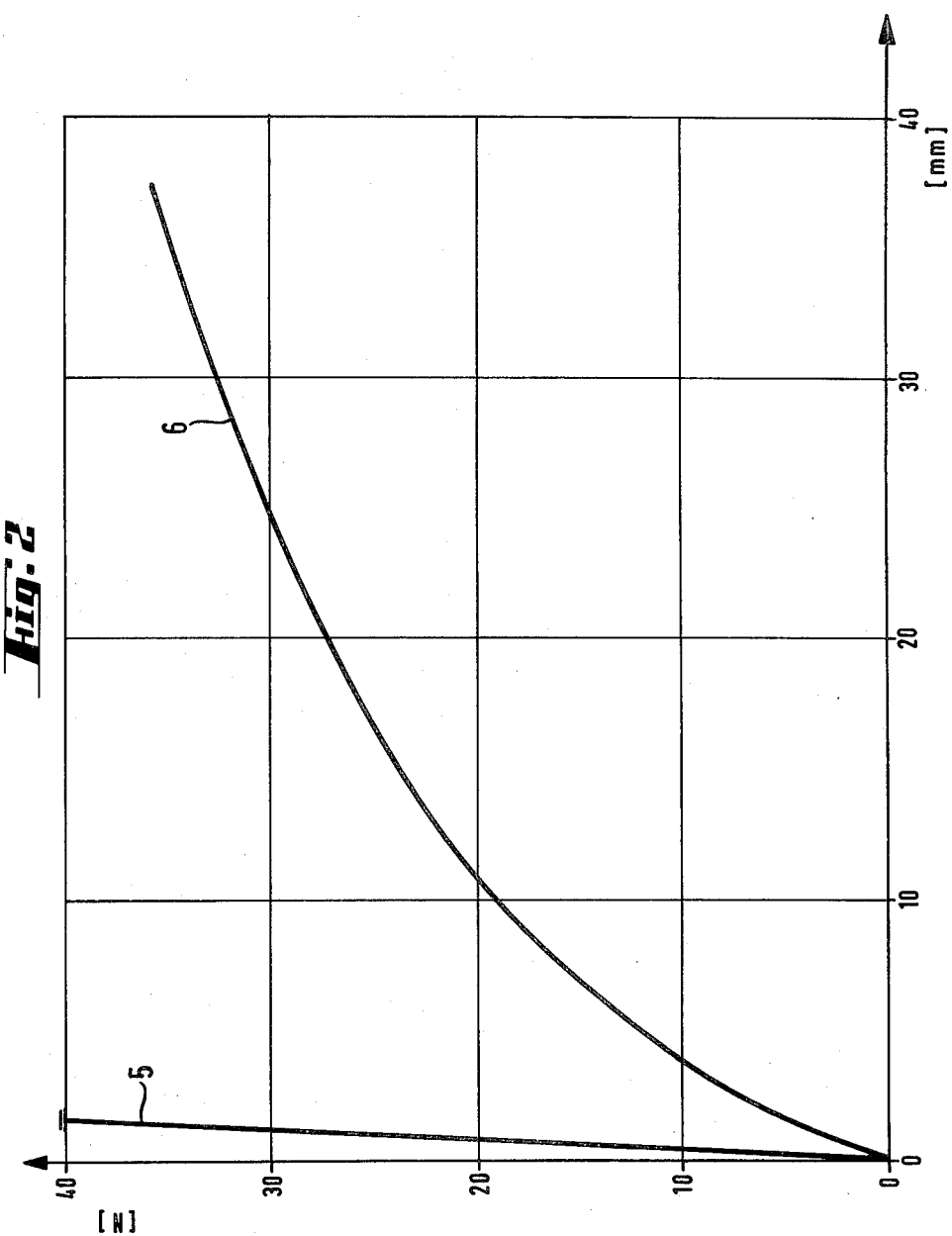
FIG. 2 explains the bendability of the present invention with the aid of a diagram.

The body illustrated in FIG. 1 includes a sheath or envelope 1 which is defined at its side edges by seams 2. Prior to being sewn up a layer 3 of separating agent is applied to the inner surfaces of the sheath 1, for which a glass fibre fabric is generally used. If as core mixture pyrogenic silica, an opacifying agent and glass fibre components are used, the glass fibre fabric is powdered with 0.2 g water-repellent pyrogenic silica per m² fabric area. Thereafter the sheath is sewn up along three edges. The material 4 to be compacted is introduced into the resulting sack. Thereafter the last edge of the sheath 1 is sewn up. The particulate material 4 in the sheath 1 is subjected to a mechanical pressure load; the pressure exerted can vary in wide limits. Generally, however, it is between 0.07 and 21 kg/cm² or more, taking account of the strength of the fabric.

A slab made by such a treatment with addition of separating agent includes a core which is completely separate from the sheath material because both parts can undergo deformation independently of each other under the pressure. Independently of the pressing rate, the core of the slab itself has a homogeneous structure which is free from slate-like irregularities.

In a comparative test two slabs were subjected to a bending strength test, one slab having been made by the method of the prior art and the other slab by the method according to the invention. The samples each had dimensions of 680×440 mm and were placed on two supports with a support spacing of 600 mm. Thereafter, a ram was applied to the center to subject the sample to a continuous shock-free load. Per minute the bending was increased continuously by one tenth of the slab thickness. At the same time a graph was plotted which is shown in simplified form in FIG. 2, the bending being plotted against the pressure exerted. From such a diagram the bending behaviour and the maximum breakage load can be determined in dependence upon the cross-section.

It is apparent from the diagram according to FIG. 2 that the sample made without separating agent (curve 5) broke after bending only 2 mm under a load of 40 N whilst the sample made with separating agent according to the invention (curve 6) did not break even after bending of 37 mm with a pressure of 35 N. Thus, whereas the slab made by the known method breaks almost immediately under load the slab according to the invention can be loaded in a wide range without breakage.

Similar results can be obtained if instead of water-repellent pyrogenic silica 5–10 g talcum or 1–2 g magnesium stearate per square meter of fabric area is used. Equally satisfactory results can be obtained by spraying the fabric surface with a polytetrafluoro ethylene spray.

FIG. 3 shows the boiler of a tank car in cross-section. This boiler is insulated with the heat-insulating body according to the invention. The boiler 7 is enclosed by several insulating slabs 8 which can easily adapt themselves to the curvature of the boiler. The insulating layer consisting of the slabs 8 is enclosed and held by the jacket and an annular member, denoted as a whole by 9. The heat-insulating slabs according to the invention are also disposed at the rounded head part of the boiler, to the curvature of which they also adapt themselves without breakage. The boiler itself rests on the underframe 10.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A flexible heat-insulating body comprising:
    an outer porous envelope having an inner surface;
    heat-insulating material in the form of a pressure-consolidated homogeneous mass on the basis of a microporous aerogel disposed within said outer porous envelope; and
    a separating agent located between said inner surface of the porous envelope and the mass of heat-insulating material such that said heat-insulating material does not adhere to the outer envelope.

2. A heat-insulating body as set forth in claim 1, wherein said aerogel comprises silica aerogel.

3. A heat-insulating body as set forth in claim 1, said separating agent comprising an organic material selected from the group consisting of fats, resins, paraffin hydrocarbons, fatty acids, metal salts of fatty acids, polymers of fluorohydrocarbons, mineral oil and mixtures thereof.

4. A heat-insulating body according to claim 1, the separating agent comprising a material selected from the group consisting of pulverulent talcum, mica, prepared chalk, lime, clay, water-repellent pyrogenic silicon, carbon black, graphite, molybdenum sulphide, zinc sulphide, a suspension in water of mineral oil, and mixtures thereof.

* * * * *